Figure 2:
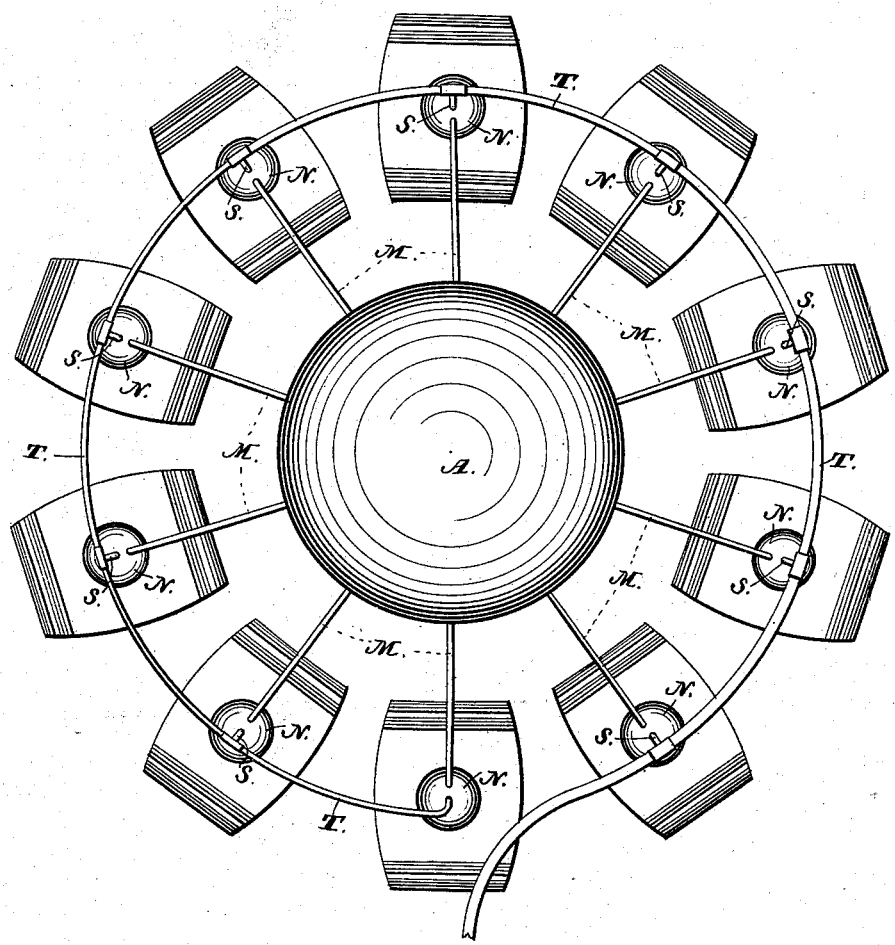

(No Model.)
2 Sheets—Sheet 1.
F. L. WOOD.
Apparatus for Aging and Purifying Spirituous Liquors.
No. 235,840.    Patented Dec. 21, 1880.
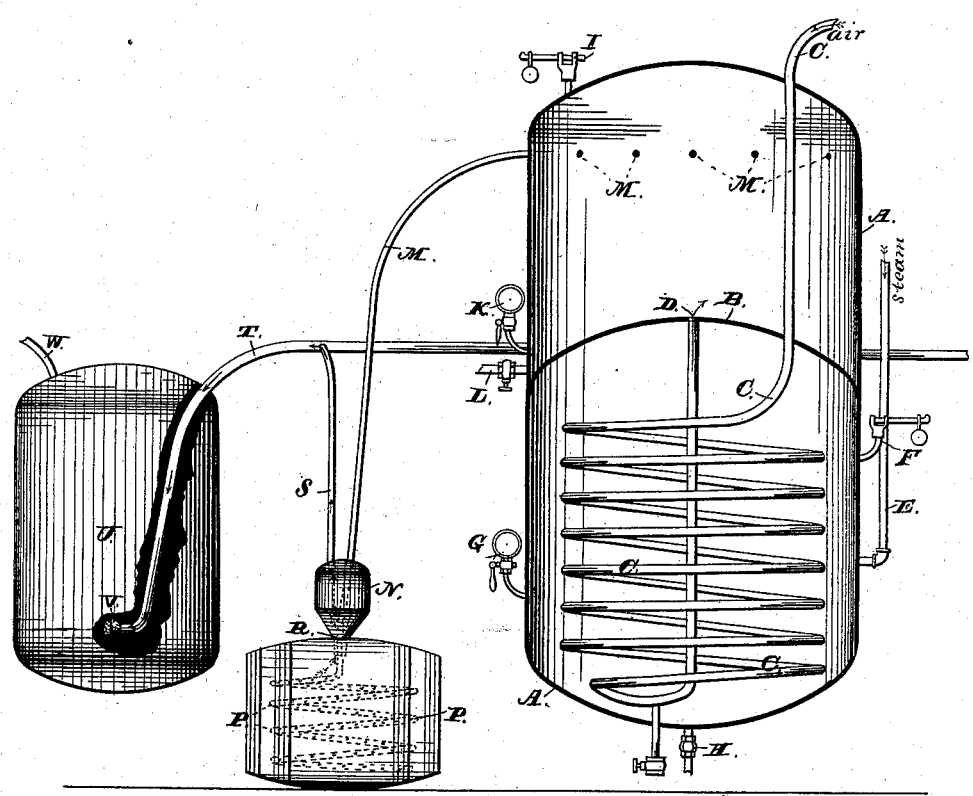
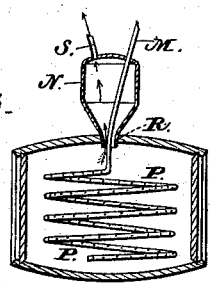
WITNESSES:
Jas. E. Hutchinson
J. A. Rutherford
INVENTOR
Francis L. Wood,
by James L. Norris.
Att'y.

(No Model.) 2 Sheets—Sheet 2.

F. L. WOOD.
Apparatus for Aging and Purifying Spirituous Liquors.

No. 235,840. Patented Dec. 21, 1880.

WITNESSES:
Jas. E. Hutchinson.
J. A. Rutherford

INVENTOR:
Francis L. Wood,
by James L. Norris.
Att'y.

UNITED STATES PATENT OFFICE.

FRANCIS L. WOOD, OF BOSTON, MASSACHUSETTS, ASSIGNOR TO THE SPIRIT PURIFYING AND AGING COMPANY, OF HARTFORD, CONNECTICUT.

APPARATUS FOR AGING AND PURIFYING SPIRITUOUS LIQUORS.

SPECIFICATION forming part of Letters Patent No. 235,840, dated December 21, 1880.

Application filed July 29, 1880. (No model.)

*To all whom it may concern:*

Be it known that I, FRANCIS L. WOOD, a citizen of the United States, residing at Boston, in the county of Suffolk and State of Massachusetts, have invented new and useful Improvements in Apparatus for Aging and Purifying Spirituous Liquors, of which the following is a specification.

This invention relates to certain improvements in that class of apparatus for purifying and aging spirituous liquors by means of heated air in the original stamped barrels or packages without emptying or transferring the same into a purifying-tank, and thus destroying its identity and the revenue-stamps employed on such barrels or packages.

The invention has for its object to provide an improved means of heating the air employed in the process of purification and aging, to regulate and equalize the pressure in the casks or packages during the treatment, and to provide for a uniform distribution of the air through an unlimited number of casks, barrels, or other packages containing liquor at an equal degree of heat and pressure.

To this end my invention consists, first, in an improved air heating and equalizing apparatus, consisting of a suitable vessel divided into two compartments by a horizontal partition, the lower compartment forming a steam-chamber, to which steam may be admitted from a boiler through suitable connections, and through which a tortuous air-pipe is passed, leading from an air-forcing apparatus and terminating in the upper compartment, which serves as a reservoir and heating-chamber, in which the air may be stored and the pressure equalized, while the air is maintained at a proper temperature until required for use.

My invention further consists in the combination, with the air conducting and heating apparatus, of an apparatus for collecting and saving the alcohol carried off by the heated air in the aging and purifying process, and for maintaining a uniform pressure throughout any desired number of casks or packages, as more fully hereinafter specified.

In the drawings, Figure 1 represents a sectional view, showing the air conducting and heating apparatus, one of the casks or packages connected therewith, and the apparatus for collecting and saving the alcohol carried off from the liquor by the heated air used in the aging and purification; and Fig. 2 represents a plan view, showing the air-heating apparatus and a series of casks or packages connected therewith, with the pipe leading to the apparatus for collecting the alcohol carried off. Fig. 3 illustrates, in section, a barrel, overflow-chamber, and perforated coil.

The letter A indicates a closed vessel or tank, constructed of metal of strength sufficient to withstand any pressure to which it may be subjected. The said tank is divided into two compartments by means of a concavo-convex partition, B, located about midway between its top and bottom, with the convex side up.

The letter C indicates a pipe leading from a suitable air-forcing apparatus down through the upper compartment of the tank into the lower one, where it is coiled, as indicated, and returned to the upper compartment, where it terminates, and with which it communicates at D.

The letter E indicates a pipe leading from a suitable steam-generator into the lower compartment of the vessel A, by means of which said compartment may be supplied with steam under any degree of pressure. The said compartment is provided with safety-valve F, steam-gage G, and outlet H, for the escape of water of condensation. The upper compartment is also provided with a safety-valve, I, pressure-gage K, and outlet L.

The letter M indicates a series of pipes, one for each cask or barrel containing liquor to be aged, extending from the upper compartment of the vessel A, through an overflow-chamber, N, and terminating in a perforated coil, P. The said overflow-chamber is provided with a nozzle, R, adapted to fit in the bung-hole of a barrel or cask, as indicated, the coil P extending into the cask, so as to inject the hot air thoroughly through its contents.

The letter S indicates an escape-pipe leading from the upper part of the overflow-chamber, and which serves to carry off the air and impurities rising up through the nozzle R from the cask or barrel. The said pipe from the respective overflow-chambers of each of the barrels or casks leads to a pipe, T, which extends into a chamber, U, terminating in a rose-jet, V, near the bottom thereof, the vessel being charged with water, whereby the alcoholic vapors carried over from the liquors under treatment are condensed and the alcohol collected and saved. The said vessel is provided with an escape-pipe, W, leading to the open air, through which the air and its absorbed impurities finally escape.

The pipe T is gradually enlarged in area as it approaches the alcohol-saving apparatus, in order to provide for the increased volume of air as successive casks or barrels connect with the same, in order to maintain a uniform pressure throughout the series.

The casks or barrels may be arranged in any manner relatively to each other and the air heating and forcing apparatus that may be found most convenient; but in practice it will be found most convenient to group them in a circle around the air-heating apparatus, as shown in the drawings, as when thus arranged they may be connected directly with the air-heating apparatus by the shortest possible connections, thus providing for the introduction of the air without material loss of heat to the casks and at a uniform temperature to each.

What I claim is—

1. In an apparatus for purifying and aging liquors, the air-heating tank divided into two compartments, the lower one connected with a steam-generator and serving as a heating-chamber, and the upper one with an air-supply pipe leading through the lower compartment, the said upper compartment serving as a storing-chamber for holding the air under pressure, equalizing the pressure, and maintaining the air at proper temperature until required for use, substantially as specified.

2. In combination with the air conducting and heating apparatus and the apparatus for collecting the alcoholic vapors, the gradually-enlarged pipe provided with means for connecting it with the casks or barrels containing the liquor under treatment, for the purpose of conducting the air from said casks uniformly as its volume is increased, substantially as specified.

3. The combination, with the air conducting and heating apparatus, of a series of radial pipes connected with the latter and provided with means for connecting with a series of casks or receptacles arranged in a circle around the air-heating apparatus, whereby the air is introduced to the casks at a uniform temperature and pressure, substantially as specified.

4. The combination of the air-heating tank, the overflow-vessels, the gradually-enlarged eduction-pipe, and the alcoholic condensing-chamber, and means for connecting with one or more of a series of casks or receptacles, substantially as and for the purposes specified.

In testimony whereof I have hereunto set my hand in the presence of two subscribing witnesses.

FRANCIS L. WOOD.

Witnesses:
   GEO. L. HUNTRESS,
   GEO. JAMES.